(12) United States Patent
Arimilli et al.

(10) Patent No.: US 6,990,545 B2
(45) Date of Patent: Jan. 24, 2006

(54) NON-DISRUPTIVE, DYNAMIC HOT-PLUG AND HOT-REMOVE OF SERVER NODES IN AN SMP

(75) Inventors: Ravi Kumar Arimilli, Austin, TX (US); Michael Stephen Floyd, Austin, TX (US); Kevin Franklin Reick, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 10/424,277

(22) Filed: Apr. 28, 2003

(65) Prior Publication Data

US 2004/0215865 A1 Oct. 28, 2004

(51) Int. Cl.
*G06F 13/00* (2006.01)

(52) U.S. Cl. .......................... 710/302; 710/10; 710/100

(58) Field of Classification Search .................... 710/8, 710/10, 100, 300–304, 104, 105; 713/1, 713/100; 709/220–222
See application file for complete search history.

(56) References Cited

U.S. PATENT DOCUMENTS

| | | | |
|---|---|---|---|
| 6,061,746 A * | 5/2000 | Stanley et al. ................. | 710/10 |
| 6,263,387 B1 * | 7/2001 | Chrabaszcz .................. | 710/302 |
| 6,282,596 B1 * | 8/2001 | Bealkowski et al. ......... | 710/302 |
| 6,338,107 B1 * | 1/2002 | Neal et al. ................... | 710/302 |
| 6,421,755 B1 * | 7/2002 | Rao ............................ | 710/302 |
| 6,532,545 B1 * | 3/2003 | Klein ............................ | 714/2 |
| 6,535,944 B1 * | 3/2003 | Johari et al. ................. | 710/302 |
| 6,859,882 B2 * | 2/2005 | Fung ........................... | 713/300 |

* cited by examiner

*Primary Examiner*—Khanh Dang
(74) *Attorney, Agent, or Firm*—Casimer K. Salys; Dillon & Yudell LLP (57) ABSTRACT

A data processing system that provides hot-plug add and remove functionality for individual, hot-pluggable components without disrupting current operations of the overall processing system. The processing system includes an interconnect fabric that includes hot plug connector at which an external hot-pluggable component can be coupled to the data processing system and logic components include configuration logic and routing and operating logic. When a hot-pluggable component is connected to the hot plug connector, the service element automatically detects the connection and selects the correct configuration file for the extended system. Once the configuration file is loaded and the system checks of the new element indicates the new element is ready for integration, the new element is integrated into the existing system, and the OS allocates workload to the new element. From a customer perspective, the entire process thus occurs without powering down or disrupting the operation of the existing element.

21 Claims, 6 Drawing Sheets

NON-DISRUPTIVE, DYNAMIC HOT-PLUG AND HOT-REMOVE OF SERVER NODES IN AN SMP

RELATED APPLICATION(S)

The present invention is related to the subject matter of the following commonly assigned, copending United States patent applications: (1) Ser. No. 10/424,254 entitled "Non-disruptive, Dynamic Hot-Add and Hot-Remove of Non-Symmetric Data Processing System Resources" filed Apr. 28, 2003; and (2) Ser. No. 10/424,278 entitled "Dynamic, Non-Invasive Detection of Hot-Pluggable Problem Components and Re-active Re-allocation of System Resources from Problem Components" filed on Apr. 28, 2003. The content of the above-referenced applications is incorporated herein by reference.

BACKGROUND OF THE INVENTION

1. Technical Field

The present invention relates generally to data processing systems and in particular to hot-pluggable components of data processing systems. Still more particular the present invention relates to a method, system and data processing system configuration that enable non-disruptive hot-plug expansion and reduction of processor nodes of a symmetric multiprocessor data processing system.

2. Description of the Related Art

The need for better and more resourceful data processing system in both the personal and commercial context has led the industry to continually improve the systems being designed for customer utilization. Generally, for both commercial and personal systems, improvements have focused on providing faster processors, larger upper level caches, greater amounts of read only memory (ROM), larger random access memory (RAM) space, etc.

Meeting customer needs have also required enabling the customer to enhance and/or expand an already existing system with additional resources, including hardware resources. For example, a customer with a computer equipped with a CD-ROM may later decide to "upgrade" to or add a DVD drive. Alternatively, the customer may purchase a system with a Pentium 1 processor chip with 64K byte memory and later decide to upgrade/change the chip to a Pentium 3 chip and increase memory capabilities to 256K-byte Current data processing systems are designed to allow these basic changes to the system's hardware configuration with a little effort. As is known by those skilled in the art, upgrading the processor and/or memory involves removing the computer casing and "clipping" in the new chip or memory stick in a respective one of the processor decks and memory slots available on the motherboard. Likewise the DVD player may be connected to one of the receiving internal input/output (I/O) ports on the motherboard. With some systems, an external DVD drive may also be connected to one of the external serial or USB ports.

Additionally, with commercial systems in particular, improvements have also included providing larger amounts of processing resources, i.e., rather than replacing the current processor with one that is faster, purchasing several more of the same processing systems and linking them together to provide greater overall processing ability. Most current commercial systems are designed with multiple processors in a single system, and many commercial systems are distributed and/or networked systems with multiple individual systems interconnected to each other and sharing processing tasks/workload. Even these "large-scale" commercial systems, however, are frequently upgraded or expanded as customer needs change.

Notably, when the system is being upgraded or changed, particularly for internally added components, it is often necessary to power the system down before completing the installation. With externally connected I/O components, however, it may be possible to merely plug the component in while the system is powered-up and running. Irrespective of the method utilized to add the component (internal add or external add), the system includes logic associated with the fabric for recognizing that additional hardware has been added or simply that a change in the system configuration has occurred. The logic may then cause a prompt to be outputted to the user to (or automatically) initiate a system configuration upgrade and, if necessary, load the required drivers to complete the installation of the new hardware. Notably, system configuration upgrade is also required when a component is removed from the system.

The process of making new I/O hardware almost immediately available for utilization by a data processing system is commonly referred to in the art as "plug and play." This capability of current system allows the systems to automatically allow the component to be utilized by the system once the component is recognized and the necessary drivers, etc. for proper operation is installed.

Figure 1A:
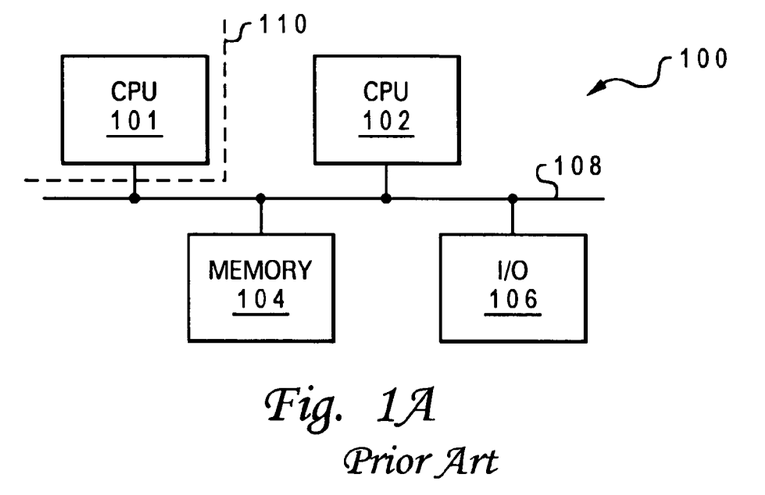
FIG. 1A is a block diagram of the major components of a multiprocessor system (MP) according to the prior art.

FIG. 1A illustrates a commercial SMP comprising processor1 101 and processor2 102, memory 104, and input/output (I/O) devices 106, all connected to each other via interconnect fabric 108. Interconnect fabric 108 includes wires and control logic for routing communication between the components as well as controlling the response of MP 100 to changes in the hardware configuration. Thus, new hardware components would also be connected (directly or indirectly) to existing components via interconnect fabric 108.

As illustrated within FIG. 1A, MP 100 comprises logical partition 110 (i.e., software implemented partition), indicated by dotted lines, that logically separates processor1 101 from processor2 102. Utilization of logical partition 110 within MP 100 allows processor1 101 and processor2 102 to operate independently of each other. Also, logical partition 110 substantially shields each processor from operating problems and downtime of the other processor.

Commercial systems, such as SMP 100 may be expanded to meet customer needs as described above. Additionally, the changes to the commercial system may be as a result of a faulty component that causes the system to not operate at full capacity or, in the worst case, to be in-operable. When this occurs, the faulty component has to be replaced. Some commercial customers rely on the manufacturer/supplier of the system to manage the repair or upgrade required. Others employ service technicians (or technical support personnel), whose main job it is to ensure that the system remains functional and that required upgrades and/or repairs to the system are completed without severely disrupting the ability of the customer's employees to access the system or the ability of the system to continue processing time sensitive work.

In current systems, if a customer (i.e., the technical support personnel) desires to remove one processor (e.g., processor1 101) from the system of FIG. 1A, the customer has to complete the following sequence of steps:

(1) The instructions are stopped from executing on processor1 101, and all the I/O is suppressed;

(2) A partition is imposed between the processors;

(3) Then, the system is shut down (powered off). From the customer's perspective, an outage is seen since the system is not available for any processing (i.e., even operations on processor2 102 are halted);

(4) Processor1 101 is removed, the system is powered back on; and (5) The system (processor2 102) is then un-quiesced. The un-quiesce process involves restarting the system, rebooting the OS, and resuming the I/O operations and the processing of instructions.

Likewise, if the customer desires to add a processor (e.g., processor1 101) to a system having only processor2 202, a somewhat reversed sequence of steps must be followed:

(1) The instructions are stopped from executing on processor2 102, and all the I/O is suppressed. From the customer's perspective, an outage is seen since the system is not available for any processing (i.e., operations on processor2 102 are halted).

(2) Then, the system is shut down (powered off).

(3) Processor1 101 is added and the system is powered back on; Processor1 101 is initialized at this point. Initialization typically involves conducting a series of tests including built in self test (BIST), etc.;

(4) The system is then un-quiesced. The un-quiesce process involves restarting the system and resume the I/O operations and resuming processing of instructions on both processors.

With large-scale commercial systems, the above 5-step and 6-step processes can be extremely time intensive, requiring up to several to hours to complete in some situations. During that down-time, the customer cannot utilize/access the system. The outage is therefore very visible to the customer and may result in substantial financial loss, depending on the industry or specific use of the system. Also, as indicated above, a mini-reboot or full reboot of the system is required to complete either the add or remove process. Notably, the above outage is experienced with systems having actual physical partitions as well, which is described below.

Figure 1B:
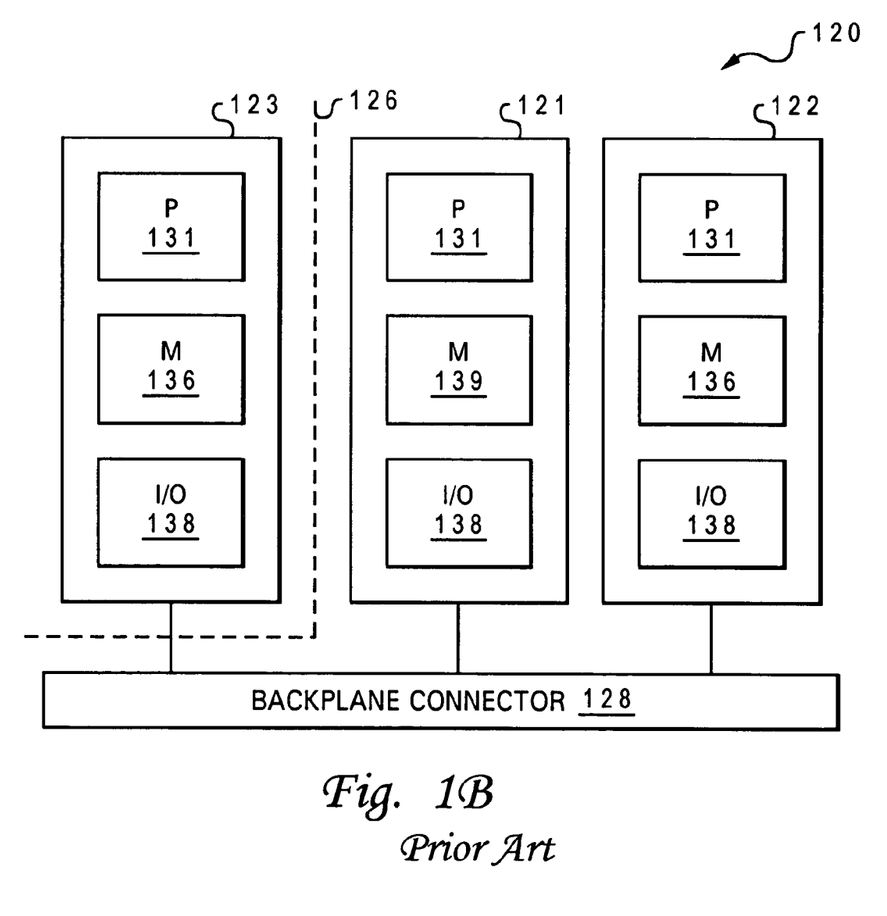
FIG. 1B is a block diagram illustrating multiple servers of a server cluster according to the prior art.

FIG. 1B illustrates a sample MP server cluster with physical partitions. MP server cluster 120 comprises three servers, server1 121, server2 122, and server3 123 interconnected via backplane connector 128. Each server is a complete processing system with processor 131, memory 136, and I/O 138, similarly to MP 100 of FIG. 1A. A physical partition 126, illustrated as a dotted line, separates server3 123 from server1 121 and server 2 122. Server1 121 and server2 122 may be initially coupled to each other and then server3 123 is later added. Alternatively, all servers may be initially coupled to each other and then server3 123 is later removed. Irrespective of whether server3 123 is being added or removed, the above multi-step process involving taking down the entire system and which results in the customer experiencing an outage is the only known way to add/remove server3 123 from MP server cluster 120.

Removal of a server or processor from a larger system is often triggered by that component exhibiting problems while operating. These problems may be caused by a variety of reasons, such as bad transistors, faulty logic or wiring, etc. Typically, when a system/resource is manufactured the system is taken through a series of tests to determine if the system is operating correctly. This is particularly true for server systems, such as those described above in FIG. 1B. Even with near 100 percent accuracy in the testing, some problems may not be detected during fabrication. Further, internal components (transistors, etc.) often go bad some time after fabrication, and the system may be shipped to the customer and added to the customer's existing system. A second series of test are usually carried out on the system when it is connected to the customer's existing system to ensure that the system being added is operating within the established parameters of the existing system. The later sequence of tests (customer-level) are initiated by a technician (or design engineer), whose job is to ensure the existing system remains operational with as little down time as possible.

In very large/complex systems, the task of running tests on the existing and newly added systems often takes up a large portion of the technician's time and when a problem occurs, the problem is usually not realized until some time after the problem occurs (perhaps several days). When a problem is found with a particular resource, that resource often has to be replaced. As described above, replacing the resource requires the technician take down the entire system, even when the resource being replaced/removed is logically or physically partitioned off from the remaining system.

A problem component that is sharing the workload of the system may result in less efficient work productions than the system without that component. Alternatively, the problem component may introduce errors into the overall processing that renders the entire system ineffective. Currently, removal of such components requires a technician to first conduct a test of the entire system, isolate which component is causing the problem and then initiate the removal sequence of steps described above. Thus, a large part of system maintenance requires the technician to continually run diagnostic tests on the systems, and system monitoring consumes a large number of man-hours and may be very costly to the customer. Also, problem components are not identified until the technician runs the diagnostic and the problem component may not be identified until it has corrupted the operation being processed by the system. Some processing results may have to be discarded, and the system may have to be backed up to the last correct state.

The present invention recognizes that it would be desirable to provide a system and method for extending the hot-plug functionality of external plug-and play components to a large-scale server system in which additional processing power is required. A method and system for hot-plugging a MP server into an SMP would be a welcomed improvement. It would be further desirable if no downtime is experienced on the system during the hot-plug operation so that the operation remains invisible to the customer. These and other benefits are provided by the invention described herein.

SUMMARY OF THE INVENTION

Disclosed is a data processing system that provides hot-plug add and remove functionality for individual, hot-pluggable components without disrupting current operations of the overall processing system. The processing system includes major components such as processor, memory and I/O devices. These components are connected to each other via an interconnect fabric made up of connecting wires, connection ports and logic components. The connection ports support hot plug components such that an external hot-pluggable component can be coupled to the data processing system. In addition to the hardware components, the data processing system includes software components, namely a service element and an operating system (OS). The logic components include configuration, routing logic, and operating logic. Configuration logic selects the configuration profile/parameters that the data processing system follows during operation. Routing logic and operating logic provide the routing protocol that controls how communications (data, etc.) are routed on the data processing system.

When a hot-pluggable component is connected to an available system connector, the service element automatically detects the connection and selects the correct configuration file for the extended system. The service element of the first component assumes the role of master and the service element of the -newly added component is then controlled by the master service element. Once the configuration file is loaded into the hardware configuration registers and the system checks of the new element indicates the new element is ready for operation, the new element is integrated into the existing system. The service element signals the OS to begin allocating workload to the new element as well. From a customer perspective, the entire process thus occurs without powering down or disrupting the operation of the existing element.

In another embodiment, removal of hot-pluggable components is also achieved without disrupting current processing of the main system that remains. The removal may be initiated by a service technician or alternatively may be automated.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

The present invention provides a method and system for enabling hot-plug add and remove functionality for major components of processing systems without the resulting down time required in current systems. Specifically, the invention provides three major advances in the data processing system industry: (1) hot-pluggable processors/servers in a symmetric multiprocessor system (SMP) without disrupting ongoing system operations; (2) hot pluggable components including memory, heterogeneous processors, and input/output (I/O) expansion devices in a multiprocessor system (MP) without disrupting ongoing system operations; and (3) automatic detection of problems affecting a hot-plug component of a system and dynamic removal of the problem component without halting the operations of other system components.

For simplicity, the above three improvements are presented as sections identified with separate headings, with the general hot plug functionality divided into a section for hot-add and a separate section for hot-remove. The content of these sections may overlap. However, overlaps that occur in the functionality of the embodiments are described in detail when first encountered and later referenced.

I. Hardware Configurations

Figure 2:
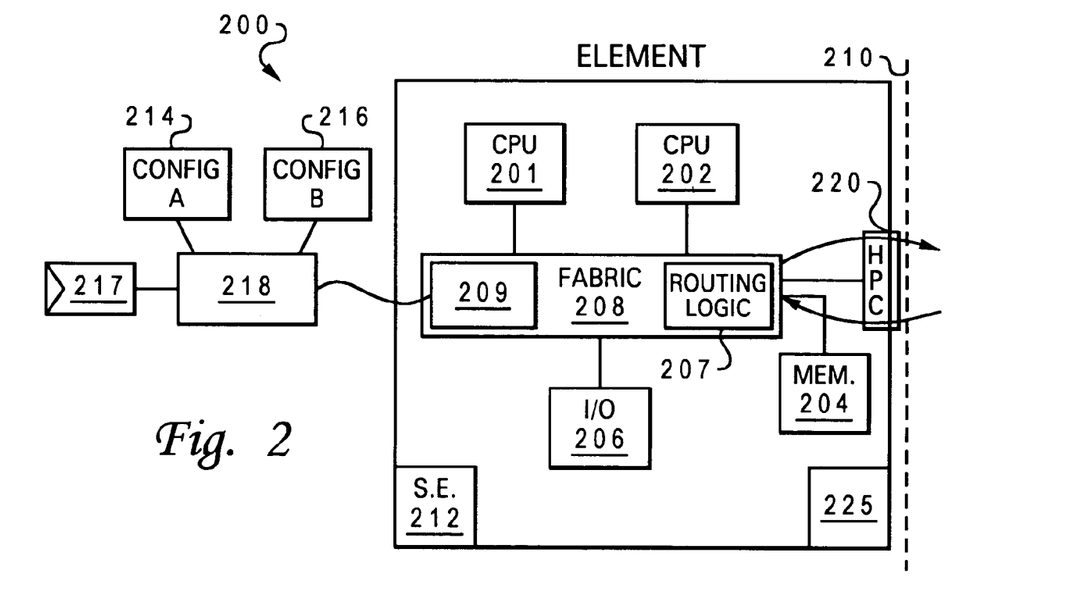
FIG. 2 is a block diagram of a data processing system (server) designed with fabric control logic utilized to provide various hot-plug features according to one embodiment of the present invention.

Turning now to the figures and in particular to FIG. 2, there is illustrated a multiprocessor system (MP) designed with fabric and other components that enable the implementation of the various features of the invention. MP 200 comprises processor1 201 and processor2 202. MP 200 also comprises memory 204 and input/output (I/O) components 206. The various components are interconnected via interconnect fabric 208, which comprises hot plug connector 220. Addition of new hot-pluggable hardware components is completed (directly or indirectly) via hot-plug connector 220, of interconnect fabric 208, as will be described in further detail below.

Interconnect fabric 208 includes wires and control logic for routing communication between the components as well as controlling the response of MP 100 to changes in the hardware configuration. Control logic comprises routing logic 207 and configuration setting logic 209. Specifically, as illustrated in the insert to the left of MP 200, configuration setting logic 209 comprises a first and second configuration setting, configA 214 and configB 216. ConfigA 214 and configB 216 are coupled to a mode setting register 218, which is controlled by latch 217. Actual operation of components within configuration setting logic 209 will be described in greater detail below.

In addition to the above components, MP 200 also comprises a service element (S.E.) 212. S.E. 212 is a small micro-controller comprising special software-coded logic (separate from the operating system (OS)) that is utilized to maintain components of a system and complete interface operations for large-scale systems. S.E. 212 thus runs code required to control MP 200. S.E. 212 notifies the OS of additional processor resources within the MP (i.e., increase/decrease in number of processors) as well as addition/removal of other system resources (i.e., memory and I/O, etc.)

Figure 3A:
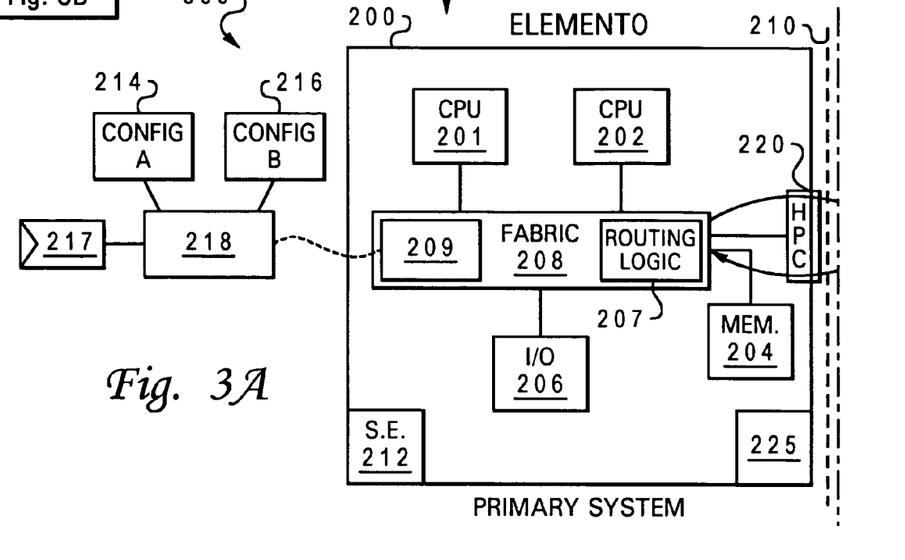
FIG. 3 is a block diagram of a MP that includes two servers of FIG. 2 configured for hot-plugging in accordance with one embodiment of the present invention.
Figure 3B:
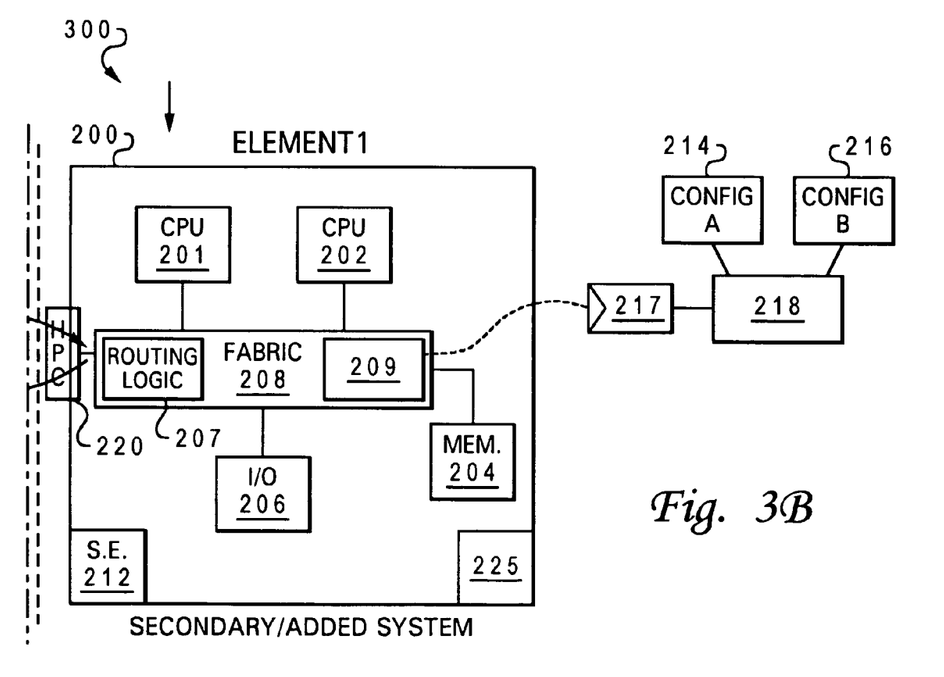

FIG. 3 illustrates two MPs similar to that of 200 of FIG. 2, that are being coupled together via hot plug connectors 220 to create a larger symmetric MP (SMP) system. MPs 200 are labeled element0 and element1 and need to be labeled as such for descriptive purposes. Element1 may be coupled to Element0 via a wire, connector pin, or cable connection that is designed for coupling hot plug connectors 220 of separate MPs. In one embodiment, MPs may literally be plugged into a background processor expansion rack that enables expansion of the customer's SMP to accommodate additional MPs.

By example, Element0 is the primary system (or server) of a customer who is desirous of increasing the processing capabilities/resources of his primary system. Element1 is a secondary system being added to the primary system by a system technician. According to the invention, the addition of Element1 occurs via the hot-plug operation provided herein and the customer never experiences downtime of Element0 while Element1 is being connected.

As illustrated within FIG. 3, SMP 300 comprises a physical partition 210, indicated by dotted lines, that separate Element1 from Element1. The physical partition 210 enables each MP 200 to operate somewhat independent of the other, and in some implementations, physical partition 210 substantially shields each MP 200 from operating problems and downtime of the other MP 200.

II. Non-disruptive, Hot-pluggable Addition of Processors in an SMP

Figures 4A, 4B:
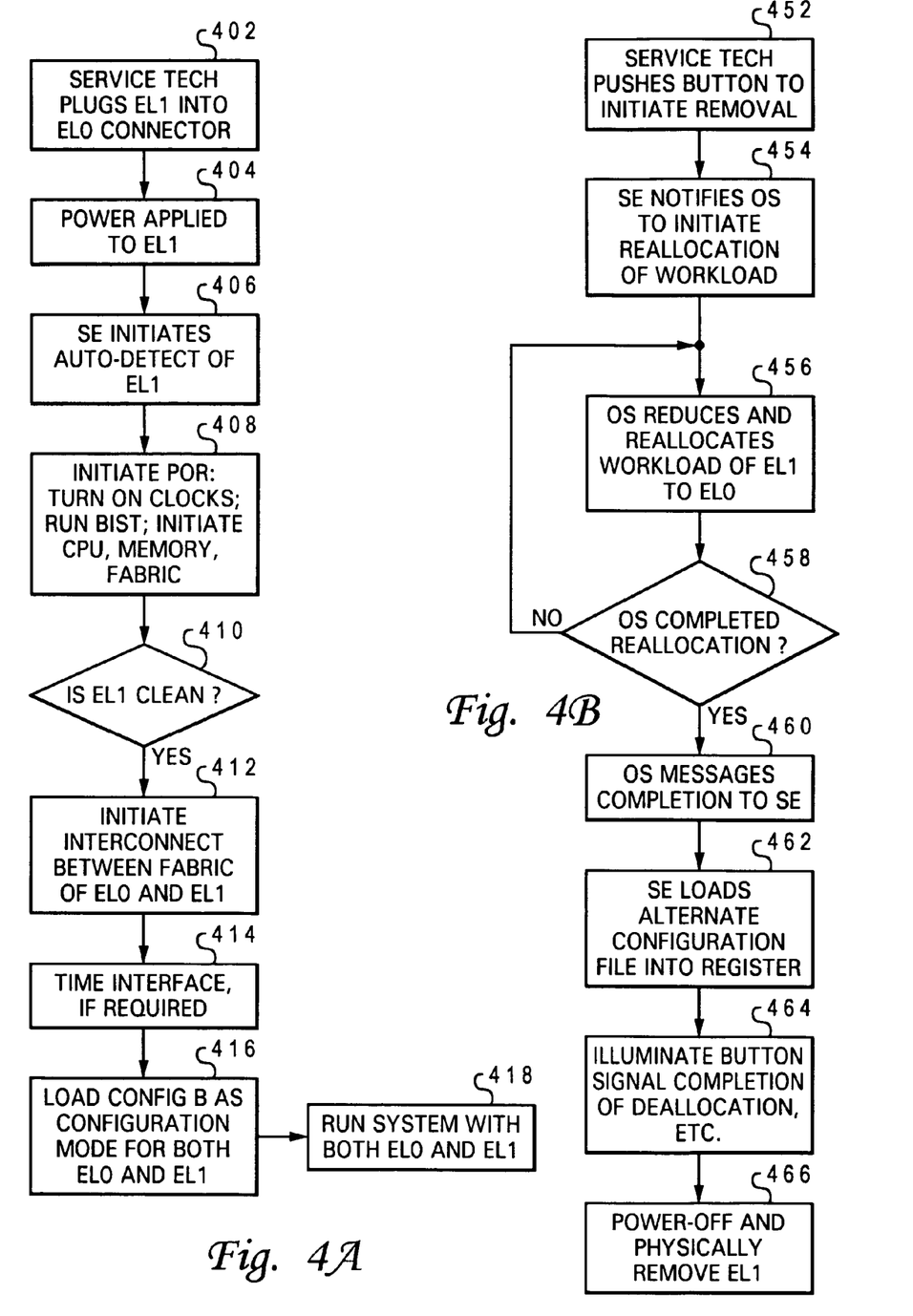
FIG. 4A is a flow chart illustrating the process of adding a server to the MP of FIG. 3 according to one embodiment of the present invention.
FIG. 4B is a flow chart illustrating the process of removing a server from the MP of FIG. 3 according to one embodiment of the present invention.

FIG. 4A illustrates a flow chart of the process by which the non-disruptive hot-plug operation of adding Element1 to Element0 is completed. According to the "hot-add" example being described below, the initial operating states of the MPs 200 are as follows:

Element0: running an OS and applications utilizing config A 214 on interconnect fabric 208; Element0 is also electrically and logically separated from Element1;

Service Element0: managing components of single MP, Element0

Fabric: routing control, etc. via config A 214, latch position set for config A;

Element1: may not yet be present or is present but not yet plugged into system.

Other/additional hardware components besides those illustrated within FIGS. 2 and 3 are possible and those provided are done so for illustrative purposes only and not meant to be limiting on the invention. In the present embodiment, MPs 200 also comprise logic for enabling the "switch over" to be completed within a set number of cycles so that no apparent loss of operating time is seen by the customer. A number of cycles may be allocated to complete the switch over. The fabric control logic requests that amount of cycles from the arbiter to perform the configuration switch. In most implementations the actual time require is on the order of one millionth of a second (1 microsecond), which, from a customer perspective is negligible (or invisible).

Returning to FIG. 4A, the process begins at block 402 when a service technician physically plugs Element1 into hot plug connector 220 of Element0, while Element0 is running. Then, power is applied to Element1 as shown in block 404. In one implementation, the technician physically connects Element1 to a power supply. However, the invention also contemplates providing power via hot plug connector 220 so that only the primary system, Element0, has to be directly connected to a power supply. This may be accomplished via a backplane connector to which all the MPs are plugged.

Once power is received by Element1, S.E.1 within Element1 completes a sequence of checkpoint steps to initialize Element1. In one embodiment a set of physical pins are provided on Element1 that are selected by the service technician to initiate the checkpoint process. However in the embodiment described herein, S.E.0 completes an automatic detection of the plugging in of another element to Element0 as shown at block 406. S.E.0 then assumes the role of master and triggers S.E.1 to initiate a Power-On-Reset (POR) of Element1 as indicated at block 408. POR results in a turning on of the clocks, running a BIST (built in self test), and initializing the processors and memory and fabric of Element1.

According to one embodiment, S.E.1 also runs a test application to ensure that Element1 is operating properly. Thus, a determination is made at block 410, based on the above tests, whether Element1 is "clean" or ready for integration into the primary system (element0). Assuming Element1 is cleared for integration, the S.E.0 and S.E.1 then initialize the interconnect between the fabric of each MP 200 while both MPs 200 are operating/running as depicted at block 412. This process opens up the communication highway so that both fabric are able to share tasks and coordinate routing of information efficiently. The process includes enabling electrically-connected drivers and receivers and tuning the interface, if necessary, for most efficient operation of the combined system as shown at block 414. In one embodiment, the tuning of the interface is an internal process, automatically completed by the control logic of the fabric. In order to synchronize operations on the overall system, causes the control logic of Element0 to assume the role of master. Element0's control logic then controls all operations on both Element0 and Element1. The control logic of Element1 automatically detects the operating parameters (e.g., configuration mode setting) of Element0 and synchronizes its own operating parameters to reflect those of Element0. Interconnect fabric 208 is logically and physically "joined" under the control of logic of Element0.

While the tuning of the interface is being completed, config B 216 is loaded into the config mode register 218 of both elements as indicated at block 416. The loading of the same config modes enables the combined system to operate with the same routing protocols at the fabric level. The process of selecting one configuration mode/protocol over the other is controlled by latch 217. In the dynamic example, when the S.E. registers that a next element has been plugged in, has completed initialization, and is ready to be incorporated into the system, it sets up configuration registers on both existing and new elements for the new topology. Then the SE performs a command to the hardware to say "go". In the illustrated embodiment, when the go command is performed, an automated state machine temporarily suspends the fabric operation, changes latch 217 to use configB, and resumes fabric operation. In an alternate embodiment, the SE command to go would synchronously change latch 217 on all elements. In either embodiment, the OS and I/O devices in the computer system do not see an outage because the configuration switchover occurs on the order of processor cycles (in this embodiment less than a microsecond). The value of the latch tells the hardware how to route information on the SMP and determines the routing/operating protocol implemented on the fabric. In one embodiment, latch serves as a select input for a multiplexer (MUX), which has its data input ports coupled to one of the config registers. The value within latch causes a selection of one config registers or the other config registers as MUX output. The MUX output is loaded into config mode register 218. Automated state machine controllers then implement the protocol as the system is running.

The operating state of the system following the hot-plug operation is as follows:

Element0: running an OS and application utilizing config B 216 on fabric 208; Element0 is also electrically and logically connected to Element1;

Element1: running an OS and application utilizing config B 216 on fabric 208;

Element1 is also electrically and logically coupled to Element0;

Service Element0: managing components of both Element0 and Element1;

Fabric: routing control, etc. via config B, latch position set for config B.

The combined system continues operating with the new routing protocols taking into account the enhanced processing capacity and distributed memory, etc., as indicated at block 418. The customer immediately obtains the benefits of increased processing resources/power of the combined system without ever experiencing downtime of the primary system or having to reboot the system.

Notably, the above process is scalable to include connection of a large number of additional elements either one at a time or concurrently with each other. When completed one at a time, the config register selected is switched back and forth for each new addition (or subtraction) of an element. Also, in another embodiment, a range of different config registers may be provided to handle up to particular numbers of hot-plugged/connected elements. For example, 4 different registers files may be available for selection based on whether the system includes 1, 2, 3, or 4 elements, respectively. Config registers may point to particular locations in memory at which the larger operating/routing protocol designed for the particular hardware configuration is stored and activated based on the current configuration of the processing system.

Figure 5:
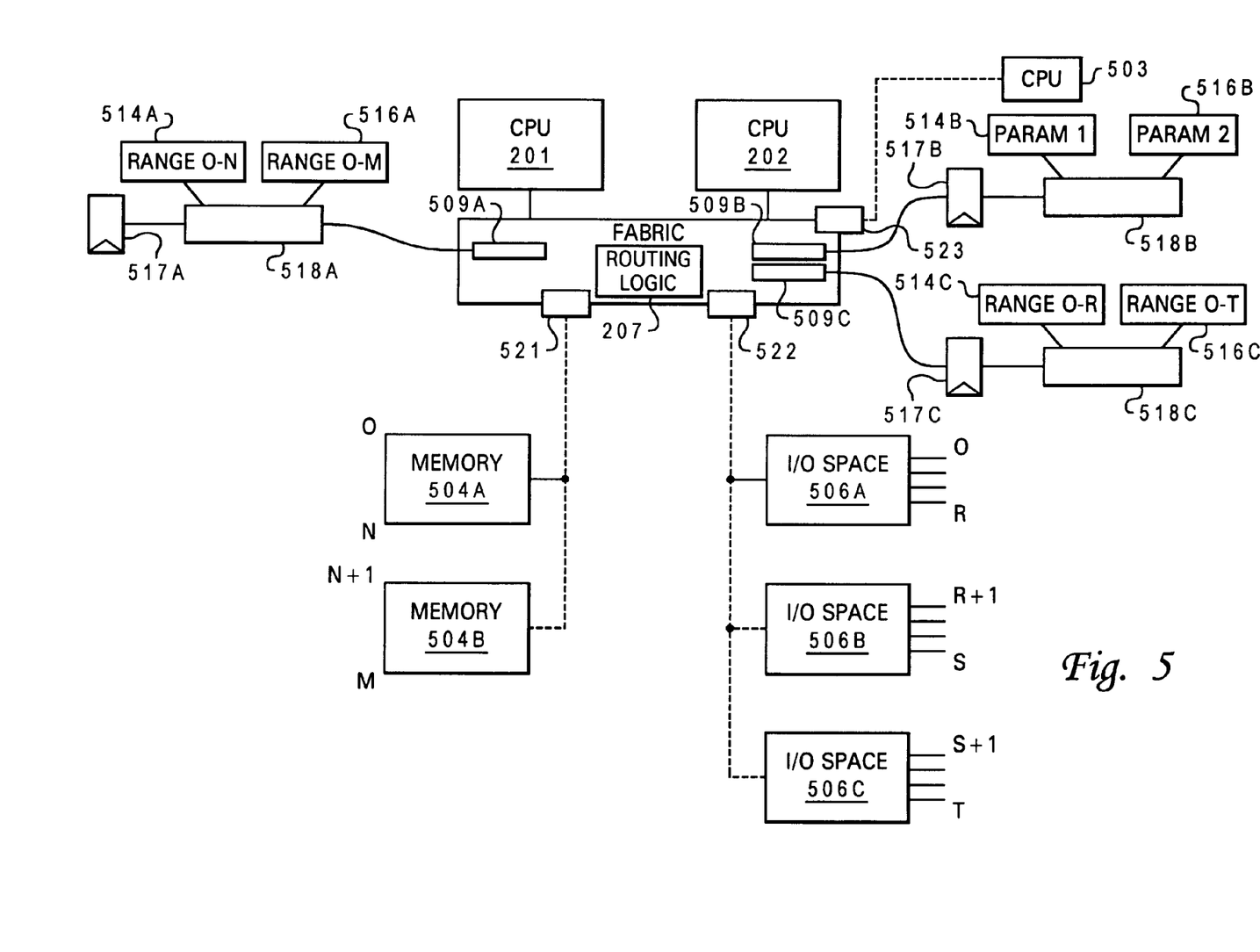
FIG. 5 is a block diagram of a data processing system that enables hot-plug expansion of all major components according to one embodiment of the invention.

III. Non-disruptive, Hot Plug of Memory, I/O Channels and Heterogeneous Processors One additional extension of the hot-plug functionality is illustrated by FIG. 5. Specifically, FIG. 5 extends the features of the above non-disruptive, hot plug functionality to cover hot-plug addition of additional memory and I/O channels as well as heterogeneous processors. MP 500 includes similar primary components as MP 200 of FIG. 2, with new components identified by reference numerals in the 500s. In addition to the primary components (i.e., processor1 201 and processor2 202, memory 504A, and I/O channel 506A coupled together via interconnect fabric 208), MP 500 includes several additional connector ports on fabric 208. Among these connector ports include hot-plug memory expansion port 521, hot-plug I/O expansion port 522, and hot-plug processor expansion port 523.

Each expansion port has corresponding configuration logic 509A, 509B, and 509C to control hot-plug operations for their respective components. In addition to memory 504A, additional memory 504B may be "plugged" into memory expansion port 521 of fabric 208 similarly to the process described above with respect to the MP 300 and Element0 and Element1. The initial memory range of addresses O to N is expanded to now include addresses N+1 to M. Configuration modes for either size memory are selectable via latch 517A which is set by S.E. 212 when additional memory 504B is added. Also, additional I/O channels may be provided by hot-plugging I/O channels 506B, 506C into hot-plug I/O expansion port 522. Again, config modes for the size of I/O channels is selectable via latch 517C, set by S.E. 212 when additional I/O channels 506B, 506C are added.

Finally, a non-symmetric processor (i.e., a processor configured/designed differently from processors 201 and 202 within MP 200) may be plugged into hot-plug processor expansion port 523 and initiated similarly to the process described above for a server/element1. However, unlike other configuration logic 509A, and 509B, which must only consider size increases in the amount of memory and I/O resources available, configuration logic 509C for processor addition involves consideration of any more parameters since the processor is non-symmetric and workload division and allocation, etc. must be factored into the selection of the correct configuration mode.

The above configuration enables the system to shrink/grow processors, memory, and/or I/O channels accordingly without a noticeable stoppage in processing on MP 500. Specifically, the above configuration enables the growing (and shrinking) of available address space for both memory and I/O. Each add-on or removal is handle independently of the others, i.e., processor versus memory or I/O, and is controlled by separate logic, as shown. Accordingly, the invention extends the concept of "hot-plug" to devices that are traditionally not capable of being hot-plugged in the traditional sense of the term.

The initial state of the system illustrated by FIG. 5 includes:

N amount of memory space;

R number of I/O space (i.e., channels for connecting I/O devices); and

Y amount of processing power and at Z speed, etc.

The final state of the system ranges from that initial state to:

M amount of memory space (M>N);

T number of I/O channels(T>R); and

Y+X amount of processing power at Z and Z+W speed.

The above variables are utilized solely for illustrative purposes and are not meant to be suggestive of a particular parameter value or limiting on the invention.

With the above embodiment, the service technician installs the new component(s) by physically plugging in an additional memory processor, and/or I/O, and then S.E. 212 completes the auto-detect and initiation/configuration process. With the installation of additional memory, S.E. 212 runs a confidence test, and with all components, the S.E. 212 runs a BIST. S.E. 212 then initializes the interfaces (represented as dotted lines) and sets up the alternate configuration registers(s). S.E. 212 completes the entire hardware switch in less that 1 microsecond, and S.E. 212 then informs the OS of the availability of the new resources. The OS then completes the workload assignments, etc. according to what components are available and which configurations are running.

IV. Non-disruptive, Removal of Hot-plugged Component in a Processing System

FIG. 4B illustrates a flow chart of the process by which the non-disruptive, removal of hot-plugged components is completed. The process is described with reference to the system of FIG. 3 and thus describes the removal of Element1 a processing the system comprising both Element1 and Element0. In the removal example, illustrated by FIG. 4B, the initial operating state of the SMP is the operating state described above following the hot-plug operation of FIG. 4A.

Removal of Element1 requires the service technician to first signal the pending removal in some way. In one embodiment, hot-removal button 225 is built on the exterior surface of each Element. Button 225 includes a light-emitting diode (LED) or other signal means by which an operating Element can be visually identified by a service technician as being "on-line" or plugged-in and functional, or offline. Accordingly, in FIG. 4B, when the service technician desires to remove Element1, the technician first pushes button 225 as shown at block 452. In another embodiment that assumes each element is clamped into a backplane connector of some sort, removal of the clamps holding Element1 in place signals S.E. 212 to commence the take down process. In yet another embodiment, a system administrator is able to trigger S.E. 212 to initiate removal operations for a specific component. The triggering is completed via selection of a removal option within a software configuration utility running on the system. An automated method of removal that does not require initiation by a service technician or system administrator is described in section 5 below.

Once button 225 is pushed, the take down process begins in the background, hidden from the customer (i.e., Element0 remains running throughout). S.E. 212 notifies the OS of processing loss of the Element1 resources as shown at block 454. In response, the OS re-allocates the tasks/workload from Element1 to Element0 and vacates element1 as indicated at block 456. S.E. 212 monitors for an indication that the OS has completed the re-allocation of all processing (and data storage) from Element1 to Element0, and a determination is made at block 458 whether that re-allocation is completed. Once the re-allocation is completed, the OS messages S.E. 212 as shown at block 460, and S.E. 212 loads an alternate configuration setting into configuration register 218 as shown at block 462. The loading of the alternate configuration setting is completed by S.E. 212 setting the value within latch 217 for selection of that configuration setting. In another embodiment, latch 217 is set when the button 225 is first pushed to trigger the removal. Element1 is logically removed and electrically removed from the SMP fabric without disrupting Element0. S.E. 212 then causes button 225 to illuminate as shown at block 464. The illumination notifies the service technician that the take down process is complete. The technician then powers-off and physically removes Element1 as indicted at block 466.

The above embodiment utilizes LEDs within button 225 to signal the operating state of the servers. Thus, a pre-established color code is set up for identifying to a customer or technician when an element is on (hot-plugged) or off (removed). For example, a blue color may indicate the Element is fully functional and electrically and logically attached, a red color may indicate the Element is in the process of being taken down and should not yet be physically removed, and a green color (or no illumination) may indicate that the Element has been taken down (or is no longer logically or electrically) and can be physically removed.

V. Non-disruptive Auto Detect and Remove of Problem Components

Given the above manual remove capability with hot-plug components, one extension of the invention provides non-invasive, automatic detection of problem elements (or components) and automatic take down of elements that are not functioning at a pre-established (or desired) level of operation or elements that are defective. With the non-invasive, hot-plug functionality of the present invention, the technician is able to remove a problem element without taking down the entire processing system. The invention extends this capability one step further by enabling an automatic problem detection for the components plugged into the system followed by a dynamic removal of problem/defective components from the system in a non-invasive manner (while the system is still operating). Unlike the technician initiated take down, the present automatic detect and responsive take down of problem elements/components occurs without human intervention and also occurs in the background without noticeable outages on the remaining processing system. The present embodiment enables the efficient detection of problem/defective components and reduces the potential problems to overall system integrity when problem components are utilized for processing tasks. The embodiment further aids in the replacement of defective components in a timely manner without outages to the remaining system.

Figure 6:
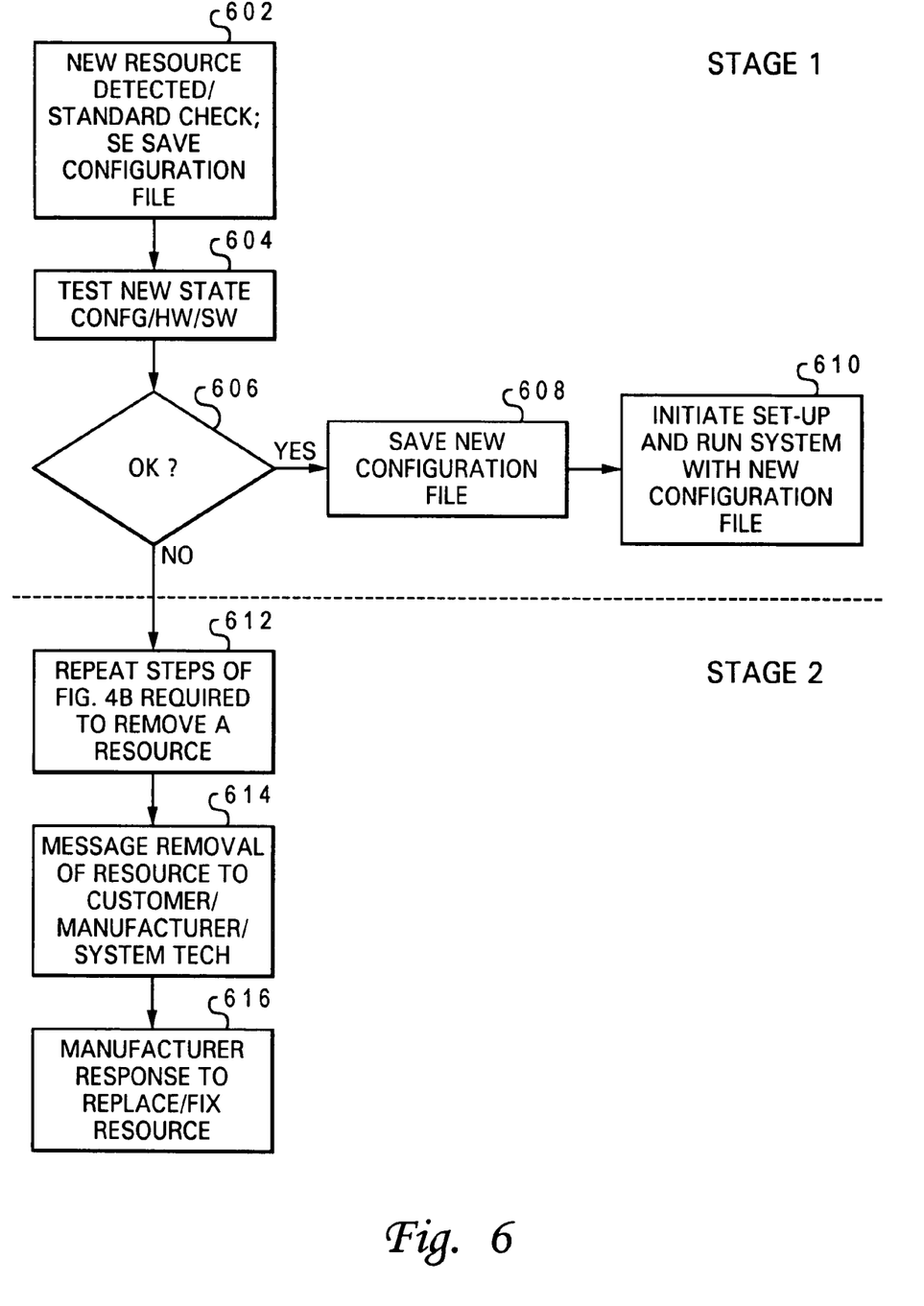
FIG. 6 is a flow chart illustrating the process by which the auto-detect and dynamic removal of hot-plugged components exhibiting detectable problems are completed according to one embodiment of the invention.

FIG. 6 illustrates the process of automatic detection and dynamic de-allocation of problem components within a hot-plug environment. The process begins at block 602 with the S.E. detecting a new component being added to the system and saving the current valid operating state (configuration state of the processors, config. registers, etc.) of the system. Alternatively, automatically S.E. saves the operating state at pre-established time intervals during system operation and whenever a new component is added to the system. A new operating state is entered and the system hardware configuration (including the new component) is tested as indicated at block 604. A determination is made at block 606 whether the test of the new operating state and system configuration produces an OK signal. The test of the system configuration may include a BIST on the entire system or a BIST on just the new component as well as other configuration tests, such as a confidence test of the new component. When the test comes back with an OK signal, the new operating state is saved as the current state as shown at block 608. Then the new operating state is implemented throughout the system as shown at block 610 and the process loops back up to the testing of any new operating states when a change occurs or a pre-determine time period elapses.

When the test comes back with problem indicators, e.g., the BIST fails or run-time error checking circuitry activates, the de-allocate stage of the detect and de-allocate process is initiated. The S.E. goes through a series of steps similar to those steps described in FIG. 4B, except that, unlike FIG. 4B, where the removal process is initiated by a service technician, the removal process in this embodiment is automated and initiated as a direct result of receiving an indication that the test failed at some level. S.E. initiates the removal process as indicated at block 612, and a message is sent to an output device as shown at block 614 to inform the customer or the service technician that a problem was found in a particular component and the component was removed (or is being removed) (i.e., taken off-line). In one embodiment, the output device is a monitor connected to the processing system and by which the service technician monitors operating parameters of the overall system. In another embodiment, the problem is messaged back to the manufacturer or supplier (via network medium), who may then take immediate steps to replace or fix the defective component as shown at block 616.

In one embodiment, the detection stage includes a test at the chip level. Thus, a manufacturer-level test is completed on the system while the system is operating and after the system is shipped to the customer. With the above process, the system is provided with manufacturing-quality self-test capabilities and automatic, non-disruptive dynamic reconfiguration based on those tests. One specific embodiment involves virtualization of partitions. At the partition switching time, the state of the partitions is saved. The manufacturer-quality self-test is run via dedicated hardware in the various components. The test requires only the same order of magnitude of time (1 microsecond) as it takes to switch a partition in the non-disruptive manner described above. If the test indicates the partition is bad, the S.E. automatically re-allocates workload away from the bad component and restores the previous good state that was saved.

While the invention has been particularly shown and described with reference to a preferred embodiment, it will be understood by those skilled in the art that various changes in form and detail may be made therein without departing from the spirit and scope of the invention.

What is claimed is:

1. A data processing system comprising:
   a first processing unit comprising an interconnect fabric interconnecting components internal to said first processing unit, wherein said interconnect fabric comprises at least one hot plug connector;
   a second processing unit capable of being electrically and logically connected to said first processing unit via said hot plug connector;
   means for completing an electrical and logical connection between said first processing unit and said second processing unit without disrupting operations occurring on said first processing unit, said means comprising a service element operatively coupled to said interconnect fabric within said first processing unit and which triggers a series of integration-ready tests on said second processing unit in response to a detection of an electrical connection of said second processing unit to said interconnect fabric, wherein said logical connection is completed only after said integration-ready tests returns a positive result; and
   means, operationally coupled to said service element, for automatically sharing a workload of said first processing unit with said second processing unit following the electrical and logical connection, wherein a configuration response is implemented on the interconnect fabric of said first processing unit to support said second processing unit sharing said workload on said interconnect fabric without disrupting said operations on said first processing unit.

2. The data processing system of claim 1, wherein said interconnect fabric further comprises:
   logic for dynamically selecting a configuration for controlling routing and communication operations of said interconnect fabric from among multiple configurations, wherein when said data processing system contains only said first processing unit said logic selects a first configuration and when said data processing system contains both said first processing unit and said second processing unit, said logic selects a second configuration.

3. The data processing system of claim 2, wherein said service element operational within said first processing unit triggers said logic to select said second configuration when said service element detects a connection of said second processing unit to said first processing unit.

4. The data processing system of claim 1, wherein:
   said first processing unit comprises an operating system (OS) that controls operations on the data processing system and allocates workload among processors and other components within said data processing system based on a current configuration of said data processing system; and
   said service element within said first processing unit triggers the OS to allocate workload of said first processing unit among both said first processing unit and said second processing unit.

5. The data processing system of claim 1, further comprising:
   a connection backplane that provides connection ports for interconnecting the hot-plug connector of said first processing unit and an associated hot plug connector of said second processing unit.

6. The data processing system of claim 1, further comprising:
   means, operatively connected to the service element, for dynamically re-configuring routing and operating protocols to accommodate said second processing unit without causing said first processor to suspend operations.

7. The data processing system of claim 1, said service element further comprising:
   means for removing an electrical and logical connection between said first processing unit and said second processing unit without disrupting operations occurring on said first processing unit.

8. The data processing system of claim 1, wherein said hot plug connector is a first hot plug connector and said second processing unit comprises a second interconnect fabric having a second hot-plug connector that is utilized to connect said second processing unit to the first processing unit via the hot plug connector.

9. A data processing system comprising:
   a first processing unit having an interconnect fabric interconnecting components internal to said first processing unit, wherein said interconnect fabric includes at least one hot plug connector;
   a second processing unit that is electrically and logically connected to said first processing unit via said hot plug connector and which is hot-pluggable;
   means, operatively coupled to the interconnect fabric, for completing an electrical and logical removal of said second processing unit from said first processing unit without disrupting operations occurring on said first processing unit, said means comprising a service element operational within said first processing unit, and which automatically generates a logical separation between said second processing unit and said first processing unit.

10. The data processing system of claim 9, wherein said interconnect fabric further comprises:
    logic for dynamically selecting a configuration for controlling routing and communication operations of said interconnect fabric from among multiple configurations, wherein when said data processing system contains both said first processing unit and said second processing unit, said logic selects a second configuration and when said data processing system contains only said first processing unit said logic selects a first configuration.

11. The data processing system of claim 10, wherein said service element operational within said first processing unit triggers said logic to select said first configuration when said service element detects initiation of a removal of said second processing unit from said first processing unit.

12. The data processing system of claim 9, wherein:
    said first processing unit comprises an operating system (OS) that controls operations on the data processing system and allocates workload among processors and other components within said data processing system based on a current configuration of said data processing system; and
    said service element operational within said first processing unit triggers the OS to re-allocate workload from said second processing unit to said first processing unit.

13. The data processing system of claim 9, further comprising:
a connection backplane, operatively coupled to the interconnect fabric, that provides connection ports for interconnecting the hot-plug connector of said first processing unit and an associated hot plug connector of said second processing unit.

14. The data processing system of claim 9, further comprising:
means, operatively connected to the service element, for dynamically re-configuring routing and operating protocols to no longer accommodate said second processing unit without causing said first processing unit to suspend operations.

15. The data processing system of claim 9, wherein said hot plug connector is a first hot plug connector and said second processing unit comprises a second interconnect fabric having a second hot-plug connector that is utilized to connect said second processing unit to the first processing unit via the hot plug connector.

16. The data processing system of claim 9, further comprising:
a third processing unit; and
means, operatively coupled to the interconnect fabric, for dynamically establishing an electrical and logical connection between said first processing unit and said third processing unit without disrupting operations occurring on said first processing unit; and
means, associated with the means for establishing the connection, for dynamically re-configuring said data processing system to accommodate said third processing unit without disrupting operations on said first processing unit.

17. In a data processing system comprising a first processing unit that includes an interconnect fabric having hot plug connectors and dynamically adjustable configuration, a system for hot-plugging a second processing unit to said first processing unit, said system comprising:
means for connecting said second processing unit to said first processing unit via said hot plug connectors;
means, operatively connected to the means for connecting for detecting a connection of said second processing unit and determining whether said second processing unit is functioning correctly;
means, associated with the means for detecting, for dynamically selecting a configuration for controlling routing and communication operations of said interconnect fabric from among multiple configurations, wherein when said data processing system contains both said first processing unit and said second processing unit, said logic selects a second configuration and when said data processing system contains only said first processing unit said logic selects a first configuration;
means, when a correctly functional second processing unit is detected, for dynamically switching a configuration of said interconnect fabric to a configuration having routing and operational protocols to support said second processing unit; and
means, operatively coupled to the means for dynamically switching, for sharing workload of said first processing unit with said second processing unit.

18. The system of claim 17, further comprising:
means for enabling hot-removal of said second processing unit without disrupting operations of said first processing unit.

19. The system of claim 18, further comprising:
an operating system (OS) that controls operations on the data processing system and allocates workload among processors and other components within said data processing system based on a current configuration of said data processing system; and
wherein said means for enabling hot-removal comprises a service element operational within said first processing unit, and which triggers said logic to select said first configuration when said service element detects initiation of a removal of said second processing unit from said first processing unit.

20. In a data processing system comprising a first processing unit that includes an interconnect fabric having hot plug connectors and dynamically adjustable configuration, a method for hot-plugging a second processing unit to said first processing unit, said method comprising:
detecting a connection of said second processing unit to said first processing unit via said hot plug connectors;
determining whether said second processing unit is functioning correctly;
dynamically selecting a configuration for controlling routing and communication operations of said interconnect fabric from among multiple configurations, wherein when said data processing system contains both said first processing unit and said second processing unit. said logic selects a second configuration and when said data processing system contains only said first processing unit said logic selects a first configuration;
when the second processing unit is detected and functioning correctly, dynamically switching a configuration of said interconnect fabric to a configuration having routing and operational protocols to support said second processing unit, wherein said switching occurs without disrupting operations on said first processing unit; and
sharing workload of said first processing unit with said second processing unit.

21. The method of claim 20, further comprising:
enabling hot-removal of said second processing unit without disrupting operations of said first processing unit said enabling being completed by a service element, operational within said first processing unit, which triggers a selection of said first configuration when said service element detects initiation of a removal of said second processing unit from said first processing unit.

* * * * *

UNITED STATES PATENT AND TRADEMARK OFFICE
CERTIFICATE OF CORRECTION

PATENT NO.       : 6,990,545 B2                                                    Page 1 of 1
APPLICATION NO.  : 10/424277
DATED            : January 24, 2006
INVENTOR(S)      : Arimilli et al.

It is certified that error appears in the above-identified patent and that said Letters Patent is hereby corrected as shown below:

In Col. 7, line 11, please replace "*Element1 from Element1.*" with -- *Element0 from Element1.* --.

Signed and Sealed this

Twenty-first Day of November, 2006

JON W. DUDAS
*Director of the United States Patent and Trademark Office*